(12) United States Patent
Malloy et al.

(10) Patent No.: US 8,781,057 B2
(45) Date of Patent: Jul. 15, 2014

(54) CONTROL SYSTEM AND METHOD FOR PRESSURIZED WATER REACTOR (PWR) AND PWR SYSTEMS INCLUDING SAME

(75) Inventors: John D. Malloy, Goode, VA (US); Billy E. Bingham, Lynchburg, VA (US)

(73) Assignee: Babcock & Wilcox mPower, Inc., Charlotte, NC (US)

( * ) Notice: Subject to any disclaimer, the term of this patent is extended or adjusted under 35 U.S.C. 154(b) by 733 days.

(21) Appl. No.: 12/970,067

(22) Filed: Dec. 16, 2010

(65) Prior Publication Data

US 2012/0155594 A1 Jun. 21, 2012

(51) Int. Cl.
- *G21C 7/32* (2006.01)
- *G21C 7/36* (2006.01)
- *G21D 3/00* (2006.01)
- *G21D 3/14* (2006.01)

(52) U.S. Cl.
CPC . *G21C 7/32* (2013.01); *Y02E 30/32* (2013.01); *G21C 7/36* (2013.01); *G21D 3/001* (2013.01); *Y02E 30/39* (2013.01); *G21D 3/14* (2013.01)
USPC .......................................... 376/210; 376/241

(58) Field of Classification Search
USPC ................................................. 376/210, 241
See application file for complete search history.

(56) References Cited

U.S. PATENT DOCUMENTS

| | | | | | |
|---|---|---|---|---|---|
| 3,916,445 | A | * | 10/1975 | Alliston et al. | 376/217 |
| 4,099,385 | A | * | 7/1978 | Silvestri, Jr. | 60/678 |
| 4,474,728 | A | * | 10/1984 | Radford | 376/339 |
| 4,707,324 | A | * | 11/1987 | Storrick | 376/215 |
| 4,912,732 | A | * | 3/1990 | Singh | 376/211 |
| 5,102,616 | A | * | 4/1992 | Gardner et al. | 376/282 |
| 5,180,543 | A | * | 1/1993 | Conway et al. | 376/282 |
| 5,517,539 | A | * | 5/1996 | Corpora et al. | 376/310 |
| 2007/0000250 | A1 | * | 1/2007 | Chaki et al. | 60/644.1 |
| 2008/0310578 | A1 | * | 12/2008 | Steltzlen et al. | 376/416 |
| 2010/0316181 | A1 | * | 12/2010 | Thome et al. | 376/372 |

* cited by examiner

*Primary Examiner* — Timothy A Brainard
(74) *Attorney, Agent, or Firm* — Michael J. Seymour; Eric Marich

(57) ABSTRACT

A pressurized water reactor (PWR) comprises a pressure vessel, a reactor core disposed in the pressure vessel, an integral or external pressurizer, primary coolant disposed in the pressure vessel and heated by operation of the reactor core, and a steam generator disposed in the pressure vessel and configured to convert secondary coolant in the form of feedwater into steam by heat transfer from the primary coolant heated by operation of the reactor core to secondary coolant in the steam generator. A controller is configured to perform a PWR control method including the operations of (i) adjusting one or more parameters of the PWR and (ii) adjusting a pressurizer water level setpoint based on a predicted direction and magnitude of change of a pressurizer water level of the PWR predicted to result from the adjusting (i).

20 Claims, 4 Drawing Sheets

US 8,781,057 B2

CONTROL SYSTEM AND METHOD FOR PRESSURIZED WATER REACTOR (PWR) AND PWR SYSTEMS INCLUDING SAME

BACKGROUND

The following relates to the nuclear reactor arts, electrical power generation arts, nuclear reactor control arts, nuclear electrical power generation control arts, and related arts.

A pressurized water reactor (PWR) employs a pressure vessel containing subcooled water as the primary coolant. Hot, subcooled water is circulated between the reactor core and one or more steam generators to transfer energy from the reactor core to the steam generator. In a conventional design, the steam generators are separate elements and the primary coolant is coupled between the pressure vessel and the steam generator via suitable high pressure fluid conduits. In an integral PWR design, the one or more steam generators are located inside the pressure vessel.

An electrically heated pressurizer is used to control the reactor coolant system pressure. The PWR contains a steam region that controls the pressure and changes its volume to accommodate changes in liquid volume in the pressure vessel and coolant loop(s). A combination of heater operation and subcooled water spray in the steam region is used to increase or decrease the amount of steam in a steam "bubble" to maintain the pressure vessel at a constant pressure. It is desired to suppress or prevent over-pressurization of the PWR during operating transients and to preserve the subcooled margin of the reactor coolant inside the reactor core to ensure adequate heat transfer.

In a typical PWR control paradigm, the water level in the pressurizer (that is, the pressurizer water level) serves as an indication of reactor coolant inventory. If the pressurizer water level drops below a predetermined level, additional makeup water is pumped into the reactor coolant system (RCS). On the other hand, if the pressurizer water level rises above another preset limit, water is letdown from the RCS.

Reactor power control in a PWR is typically a complex process in which numerous control variables (for example, steam flow, feedwater flow, "gray" control rod positioning) are concurrently adjusted to maintain the desired operational state and to control transient behavior. These adjustments are constrained by the requirement to keep the pressurizer level within the preset limits so as to avoid overpressurization or underpressurization.

To provide additional PWR reactivity control, it is known to add an effective amount of a soluble neutron poison, typically boron in the form of boric acid, to the primary coolant. The soluble boron poison reduces the magnitude of the moderator temperature coefficient. Thus, the boron concentration in the primary coolant provides yet another "adjustment knob" for controlling reactor power output. In some PWR's, the concentration of boric acid is varied over the fuel cycle to offset changes in reactor core reactivity as the nuclear fuel is consumed. The boron concentration is selected such that the moderator temperature coefficient and moderator void coefficient both remain negative. The magnitude of these coefficients is substantially reduced by the addition of the boron poison; however as a result, changes in water temperature inside the reactor have reduced impact on core power, thus simplifying control.

With reference to FIG. 1, a typical relationship between the reactor coolant temperature (abscissa) and reactor power (ordinate) is shown. FIG. 1 plots the hot leg temperature ($T_{hot}$) relationship, the cold leg temperature ($T_{cold}$) relationship, and the average temperature ($T_{ave}$) relationship. The integrated control system simultaneously controls steam flow, feedwater flow, and the control rods in the reactor to alter core power output for transients. The soluble boron poison is typically reduced as the fuel burns to minimize the rod insertion into the reactor core. FIG. 1 plots the programmed reactor coolant temperatures inside the reactor pressure vessel using this approach. As power level increases, reactor inlet temperature drops and reactor outlet temperature rises to maintain a constant average temperature in the core and steam generator. The constant average temperature minimizes any volume changes in the reactor coolant as the power level changes. As a result, the pressurizer water level between the heated water and steam regions in the pressurizer remains essentially constant during changes in power level.

Any deviation of the pressurizer water level that does exceed the upper or lower preset level limit causes water to be letdown or makeup water added to the RCS, in order to maintain the constant pressurizer water level setpoint. However, such corrective events are not common during normal operation, because the moderator temperature coefficient and moderator void coefficient are both small, and the control system maintains a nearly constant average water temperature.

Disclosed herein are further improvements that provide reduced cost, simplified manufacturing, and other benefits that will become apparent to the skilled artisan upon reading the following.

BRIEF SUMMARY

In one aspect of the disclosure, an apparatus comprises: an apparatus comprises a circuit or digital processor configured to adjust reactor power generated by a pressurized water reactor (PWR) by: (i) changing an average primary coolant temperature of primary coolant of the PWR, and (ii) adjusting a pressurizer water level setpoint of the PWR upward if the change (i) is to a higher average primary coolant temperature and downward if the change (i) is to a lower average primary coolant temperature.

In another aspect of the disclosure, a pressurized water reactor (PWR) comprises: a pressure vessel; a reactor core disposed in the pressure vessel; an integral or external pressurizer; primary coolant disposed in the pressure vessel and heated by operation of the reactor core, the primary coolant not including a soluble boron poison in the primary coolant; and an apparatus as set forth in the immediately preceding paragraph.

In another aspect of the disclosure, a method comprises: performing a pressurized water reactor (PWR) power adjustment; and adjusting a pressurizer water level setpoint based on a predicted direction and magnitude of change of a pressurizer water level of the PWR predicted to result from the performing the PWR power adjustment.

In another aspect of the disclosure, a pressurized water reactor (PWR) comprises: a pressure vessel; a reactor core disposed in the pressure vessel; an integral or external pressurizer; primary coolant disposed in the pressure vessel and heated by operation of the reactor core, the primary coolant not including a soluble boron poison in the primary coolant; and a controller configured to perform a method as set forth the immediately preceding paragraph.

In another aspect of the disclosure, a pressurized water reactor (PWR) comprises: a pressure vessel; a reactor core disposed in the pressure vessel; an integral or external pressurizer; primary coolant disposed in the pressure vessel and heated by operation of the reactor core; an integral steam generator disposed in the pressure vessel and configured to convert secondary coolant in the form of feedwater into steam by heat transfer from the primary coolant heated by operation of the reactor core to secondary coolant in the steam generator; and a controller configured to perform a PWR control method including the operations of (i) adjusting one or more parameters of the PWR and (ii) adjusting a pressurizer water level setpoint based on a predicted direction and magnitude of change of a pressurizer water level of the PWR predicted to result from the adjusting (i).

BRIEF DESCRIPTION OF THE DRAWINGS

The invention may take form in various components and arrangements of components, and in various process operations and arrangements of process operations. The drawings are only for purposes of illustrating preferred embodiments and are not to be construed as limiting the invention.

DETAILED DESCRIPTION OF THE PREFERRED EMBODIMENTS

Figure 1:
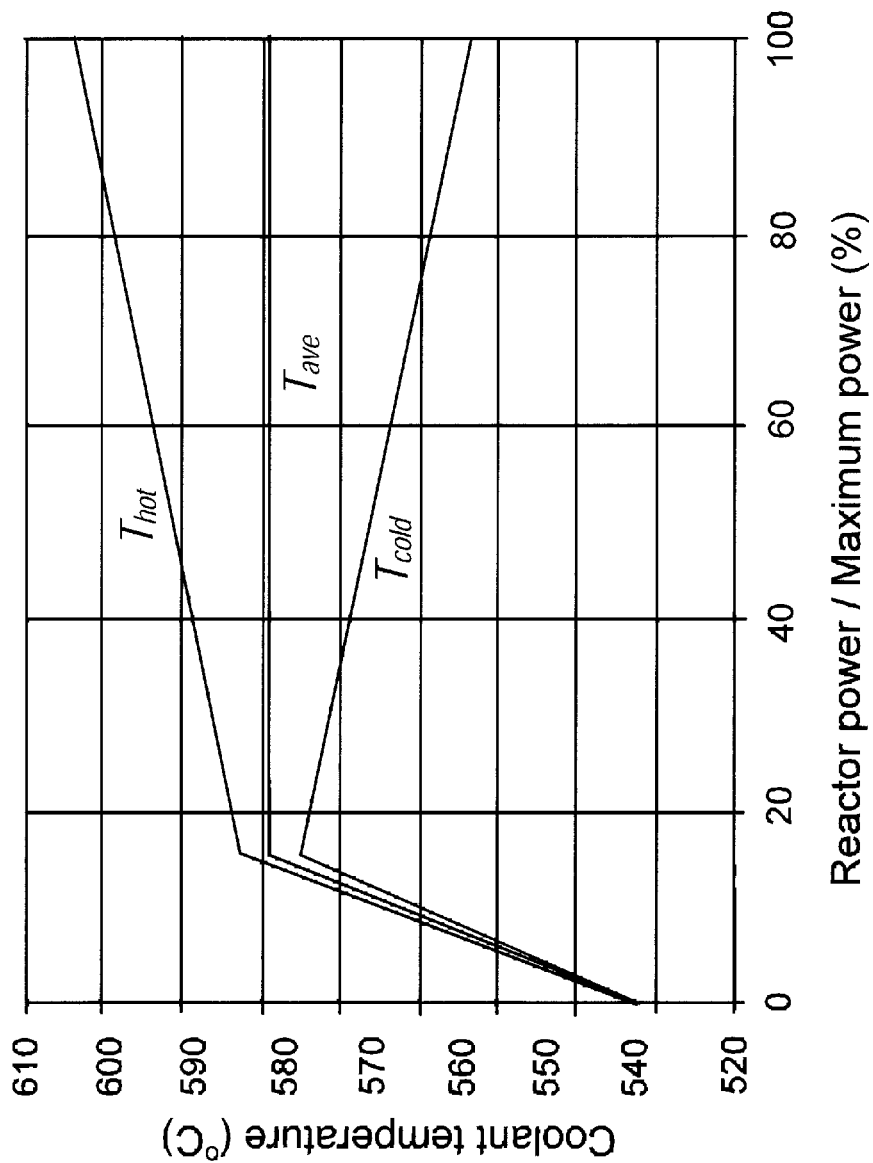
FIG. 1 plots (abscissa) a typical hot leg temperature ($T_{hot}$), cold leg temperature ($T_{cold}$), and average temperature ($T_{ave}$) versus (ordinate) reactor power for a PWR employing reactor control according to the prior art.

As described herein with reference to FIG. 1, existing reactor control systems advantageously benefit from the suppression of pressurizer water level control transients due to reduced moderator temperature coefficient and moderator void coefficient values provided by the soluble boron poison. This effectively removes (or nearly removes) pressurizer water level as a controlled parameter during reactor power transient events.

However, the inclusion of boric acid or another soluble poison in the primary coolant has substantial disadvantages. The boric acid can generate undesirable chemical reactions during reactor operation at elevated temperatures. Boric acid also presents environmental concerns and complicates waste disposal. Still further, using boric acid as a safety control, e.g. to suppress reactivity, can introduce safety concerns. For at least these reasons, there is interest in operating PWR nuclear power systems without using boric acid, and more generally without using a soluble neutron poison.

However, a PWR operating without a soluble neutron poison has moderator temperature and void coefficients that are still negative, but with substantially larger absolute values over the fuel cycle as compared with a PWR operating with borated primary coolant. These larger (absolute) moderator temperature and void coefficients lead to substantial volume changes in the primary reactor coolant as the power level changes, which if left uncontrolled would lead to substantial changes in pressurizer water level during power transients. As a consequence, the PWR control system takes a more active role in maintaining the pressurizer water level setpoint, by performing coolant letdown to avoid overpressurization or coolant makeup to avoid underpressurization. These frequent pressurizer water level letdown/makeup control events further complicate the already-complex PWR reactor control, and generate additional radioactive waste in the form of additional contaminated primary coolant.

It is recognized herein, however, that by employing a different control paradigm that allows constrained changes in the pressurizer water level during reactor power level changes, these changes can actually simplify reactor control during power transients. In effect, the disclosed approach for controlling reactor core power output actually relies on the larger (absolute) reactivity coefficients to simplify reactor control.

Figure 2:
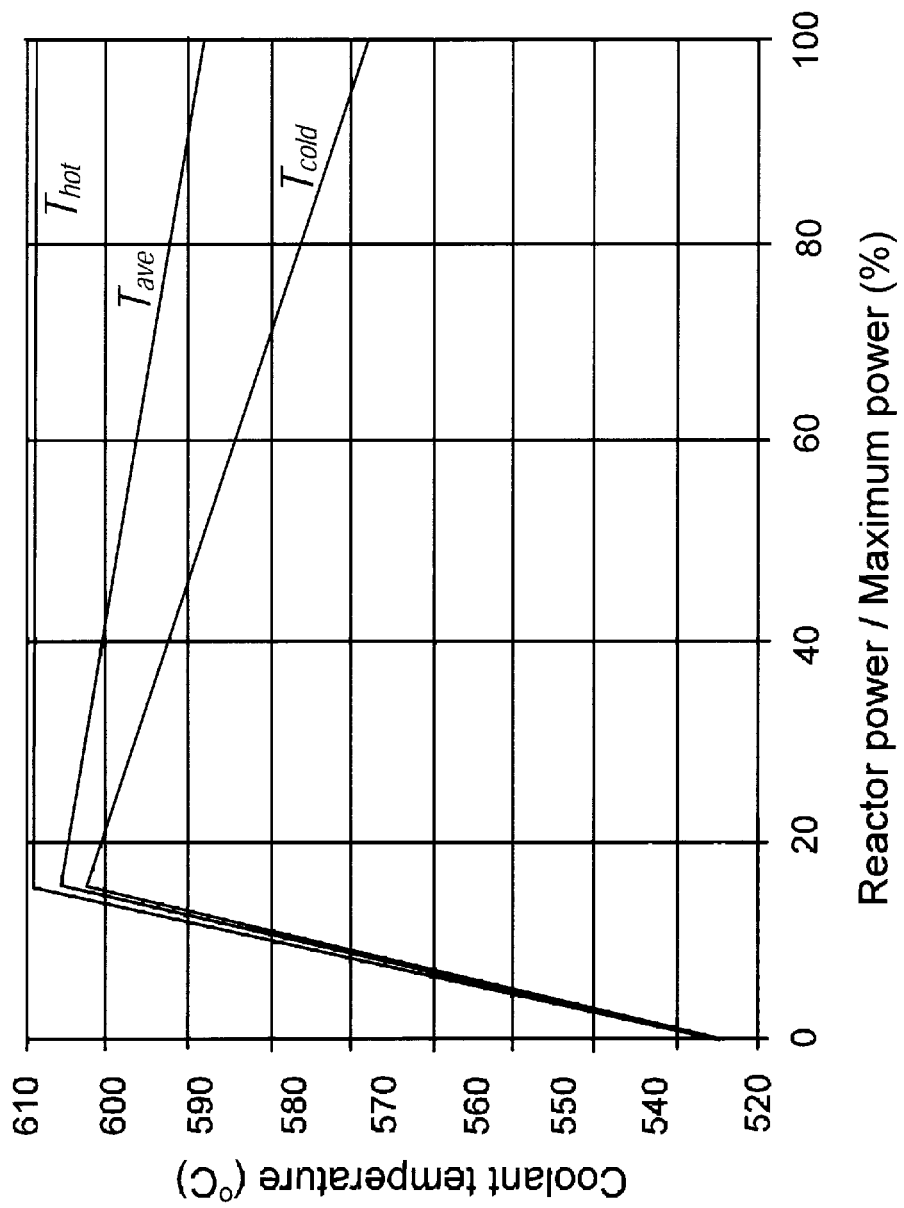
FIG. 2 plots (abscissa) a typical hot leg temperature ($T_{hot}$), cold leg temperature ($T_{cold}$), and average temperature ($T_{ave}$) versus (ordinate) reactor power for reactor control as disclosed herein.

With reference to FIG. 2, the disclosed control approaches are based on the observation made herein that the change of reactivity is in the "correct" direction to assist in reactor control. For example, consider a reactor operating at a steady state, into which a step increase in feedwater flow is introduced. The increased feedwater flow does not strongly impact the hot leg temperature ($T_{hot}$), but does cause a substantial reduction in the cold leg temperature ($T_{cold}$) and consequently causes a substantial reduction in the average temperature ($T_{ave}$). Because of the large negative moderator temperature and void coefficients, the reduced temperature of the primary coolant substantially increases the reactor core reactivity. In physical terms, the reduced temperature increases the water density which makes the denser water a more efficient neutron moderator which in turn increases the thermal neutron population and increases the reactivity.

However, the reduction in water temperature also produces a concomitant reduction in the pressurizer water level in the absence of any pressurizer water level correction. Conventionally, the reduction in pressurizer water level would be detected as incipient low water inventory (a potential safety issue), and the pressurizer level control system would add makeup water to compensate.

In the event of reduced feedwater flow, the sequence is reversed. The reduced feedwater flow increases the cold leg temperature ($T_{cold}$) and hence increases the average temperature ($T_{ave}$) which in turn substantially reduces core reactivity due to the large negative moderator temperature and void coefficients while concurrently increasing the pressurizer water level. This increase would conventionally be detected as incipient excess water inventory (again, a potential safety issue), and the pressurizer level control system would letdown primary reactor coolant to compensate.

The effect on reactivity of the water makeup or letdown event performed to maintain the pressurizer level setpoint is complex, since it can affect primary coolant temperature, pressure, and flow. Control therefore would entail complex modeling of the entire system including all these interactions. In all such cases, the control events would include undesirable water makeup or letdown events in order to maintain the pressurizer level setpoint so as to avoid overpressurization or underpressurization during load changes.

The disclosed PWR control approaches are based on recognition that the pressurizer water level change resulting from a change in feedwater flow rate is not an indication of incipient overpressurization or underpressurization implicating a safety concern—rather, these pressurizer water level changes are a natural consequence of the change in feedwater flow rate, and moreover, the accompanying change in reactivity is advantageous for reactor control. The disclosed PWR control approaches allow for this natural change in pressurizer water level by relating the pressurizer water level setpoint with the feedwater flow rate.

With continuing reference to FIG. 2, a suitable control process is as follows. The reactor primary coolant outlet temperature (that is, the primary coolant output from the reactor core, which is the hot leg temperature, $T_{hot}$) is held to a constant value and as the reactor inlet temperature (that is, the cold leg temperature, $T_{cold}$, corresponding with steam generator outlet temperature) drops. This results in a decrease in the average temperature ($T_{ave}$), which in turn leads to an increase in reactor core power output. Thus, instead of relying on a complex integrated control system to control the average reactor temperature, the PWR can be controlled by the feedwater control valve. Increasing feedwater flow will increase energy removal through the steam generator, causing reactor coolant temperature leaving the steam generator to decrease. The reduced reactor coolant temperature decreases average coolant temperature in the reactor core thus causing the reactor core fission rate to increase and produce more power due to the negative coolant temperature coefficient.

A natural consequence of this approach is a change in reactor coolant volume as a function of power, due to changes in the cold leg temperature. The impact on the volume of water in the reactor coolant system (RCS) is as follows. When power increases due to a decrease in the steam generator outlet temperature and core inlet temperature, the average density of the reactor coolant increases. (This is because the colder primary coolant water is more dense). This increased average primary coolant density reduces the volume of coolant in the pressurizer causing the pressurizer coolant level to drop. It is recognized herein that this water level decrease is expected, and the control system accommodates this expected decrease in water level by lowering the pressurizer water level setpoint. Thus, as the power level (or, equivalently in this control paradigm, the feedwater flow rate) increases, the nominal pressurizer water level setpoint is decreased by the control system. The actual pressurizer level control parameters are an upper and lower limit, which in this approach are not preset values but rather are upper and lower limits that track with the change in water level setpoint so that the allowable band or range for the pressurizer water level moves with the setpoint (which, in turn, moves with the power level or feedwater flow rate). This eliminates (or at least reduces) the likelihood of a makeup when the power level increases or letdown flow when the core power is decreased.

The control operations can thus be summarized as follows. To increase the power output, the feedwater flow rate is increased and concurrently the pressurizer water level setpoint is decreased. On the other hand, to decrease the power output, the feedwater flow rate is decreased and concurrently the pressurizer water level setpoint is increased.

Increasing or decreasing feedwater flow rate is a straightforward procedure, as it merely entails adjusting the feedwater inlet valve setting. Accordingly, the foregoing PWR control approach is readily implemented.

However, it will be recognized that another way the control approach can be implemented is to maintain a constant feedwater flow rate, and instead adjust the inlet feedwater temperature. In this case, a reduction in inlet feedwater temperature produces a reduction in the primary coolant temperature resulting in increased core reactivity and hence increased core output, with concomitant reduction in the pressurizer water level. Conversely, increasing inlet feedwater temperature produces an increase in the primary coolant temperature resulting in reduced core reactivity and hence reduced core output, with concomitant increase in the pressurizer water level. In this alternative approach, to increase the power output the inlet feedwater temperature is decreased and concurrently the pressurizer water level setpoint is also decreased. On the other hand, to increase the power output, the inlet feedwater temperature is increased and concurrently the pressurizer water level setpoint is also increased.

Table 1 summarizes the PWR control operations. In this table: $\Delta T_{ave}$ is the direction of change of the average primary coolant temperature; $\Delta[N_{thermal}]$ is the direction of the change in the thermal neutron population; $\Delta P_{reactor}$ is the direction of change in the reactor power output (or, equivalently, in the reactivity of the reactor); $\Delta V_{primary}$ is the direction of change in the volume of primary coolant in the reactor coolant system (RCS); and "Setpoint" is appropriate direction of adjustment of the pressurizer water level setpoint.

TABLE 1

Summary of PWR control operations

| Reactor power adjustment | $\Delta T_{ave}$ | $\Delta[N_{thermal}]$ | $\Delta P_{reactor}$ | $\Delta V_{primary}$ | Setpoint |
|---|---|---|---|---|---|
| Increase feedwater flow rate | Down | Up | Up | Down | Down |
| Decrease feedwater flow rate | Up | Down | Down | Up | Up |
| Raise inlet feedwater temperature | Up | Down | Down | Up | Up |
| Lower inlet feedwater temperature | Down | Up | Up | Down | Down |

In considering the control operations set forth in Table 1, it will be appreciated that the feedwater flow rate and inlet feedwater temperature adjustments can be combined. For example, to raise the reactor power it is contemplated to raise the feedwater flow rate and also lower the inlet feedwater temperature. Both operations raise the reactor reactivity ($\Delta P_{reactor}$ is adjusted upward) and both operations also decrease the primary coolant volume ($\Delta V_{primary}$ is downward)—accordingly, in addition to both raising the feedwater flow rate and also lowering the inlet feedwater temperature, the pressurizer water level setpoint is suitably decreased. Conversely, to lower the reactor power it is contemplated to lower the feedwater flow rate and also raise the inlet feedwater temperature, and the pressurizer water level setpoint is also suitably increased. More generally, it will be noticed that operations which increase the reactor power also decrease the primary coolant volume (so that the pressurizer water level setpoint should be decreased); whereas, operations which decrease the reactor power also increase the primary coolant volume (so that the pressurizer water level setpoint should be increased).

An illustrative PWR employing an embodiment of the disclosed reactor control is next set forth.

Figure 3:
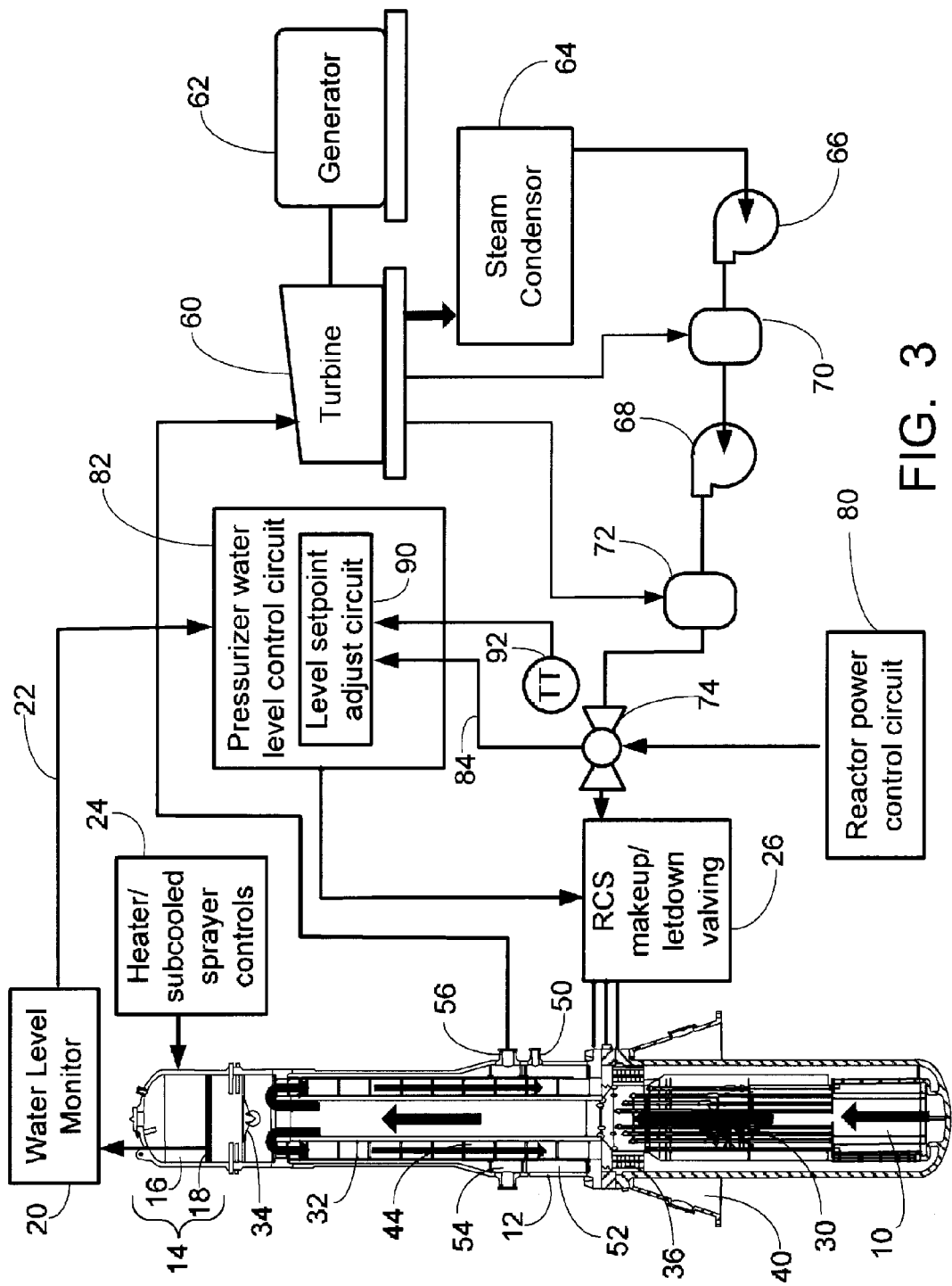
FIG. 3 diagrammatically shows a PWR system employing reactor control as disclosed herein.

With reference to FIG. 3, a perspective sectional view an illustrative pressurized water nuclear reactor (PWR) including an integral steam generator is shown. A nuclear reactor core 10 is disposed inside a generally cylindrical pressure vessel 12, which contains primary coolant, which in the illustrative case of a light water reactor is water ($H_2O$) which does not contain soluble boron (e.g., dissolved boric acid). Typically, the primary coolant does not include or contain any soluble neutron poison—however, it is contemplated to employ boric acid or another soluble neutron poison of a type and/or at a concentration for which the primary coolant retains substantial (negative) values for the moderator temperature coefficient and moderator void coefficient. Although light water ($H_2O$) is preferred as the primary coolant, it is also contemplated to employ another primary coolant having substantial (negative) values for the moderator temperature and void coefficients, such as heavy water ($D_2O$).

The illustrative PWR includes an integral pressurizer 14 located at the top of the pressure vessel 12. The integral pressurizer 14 comprises a volume containing primary coolant residing in a lower portion and a steam bubble 16 in the upper portion of the volume, with a pressurizer water level 18 delineating between the steam bubble 16 and the water. A water level sensor (not shown) disposed in the pressure vessel 12 generates a measurement signal indicative of the pressurizer water level 18 which is received by a water level monitor 20. The diagrammatically illustrated water level monitor 20 is external to the pressure vessel 12; however, it is also contemplated for this monitor to be internal to the pressure vessel, for example embodied as a combined water level sensor/monitor. Moreover, in some embodiments the water level sensor may simply be an optical fiber passing through a pressure vessel penetration to optically observe the pressurizer water level 18, or a sensor external to the pressure vessel may monitor the water level by detecting an external characteristic such as a magnetoelectric characteristic. The water level monitor 20 generates a measured pressurizer water level value 22.

The integral pressurizer 14 also includes suitable controls 24 (diagrammatically indicated in FIG. 3) for adjusting the pressure, such as one or more heaters for heating the steam in the steam bubble 16, or a subcooled water sprayer for cooling the steam bubble 16. The illustrative pressurizer 14 is an integral pressurizer in which heaters and water sprayers operate directly on the steam bubble 16. However, it is also contemplated to employ an external pressurizer instead of the illustrative integral pressurizer 14. In this alternative design, the steam bubble 16 is in fluid communication via a suitable pressure vessel penetration with an external volume (that is, external to the pressure vessel 12). Heaters or other control elements operate on the external volume to adjust its pressure, and the pressure adjustments are communicated to the steam bubble 16 via fluid communication with the external volume. In such alternative embodiments employing an external pressurizer, the water level 18 delineating the steam bubble 16 is still referred to herein as the pressurizer water level 18.

Reactor coolant system (RCS) makeup/letdown valving 26 are configured to enable makeup water to be added to the RCS in the event of underpressurization, and to allow primary coolant to be let down in the event of overpressurization. Other valving and/or components (not shown) may also be provided for regulating the RCS. For example, although a high concentration of boric acid is not employed as a neutron poison in the primary coolant during normal operation, it is contemplated to provide a boric acid or other neutron poison reservoir arranged for rapid delivery into the RCS as an emergency measure, that is, to rapidly shut down core reactivity in the event of a loss of coolant accident (LOCA) or other abnormal event.

Reactor control is provided by a control rod drive mechanism (CRDM) 30 that is configured to controllably insert and withdraw neutron-absorbing control rods into and out of the nuclear reactor core 10. The CRDM 30 may be divided into multiple units, each controlling one or more control rods, in order to provide redundancy or other benefits. The illustrative CRDM 30 is an internal system in which the drive motors and other components are disposed inside the pressure vessel 12 with only electrical power and control wiring extending outside the pressure vessel 12. Alternatively, external CRDM may be employed, in which (by way of illustrative example) control rod drive motors may be mounted above the pressure vessel with the control rods passing into the pressure vessel and extending (retractably) into the reactor core via suitable pressure vessel penetration.

The pressure vessel 12 is also configured to define a desired primary coolant circulation. In the illustrative example, the circulation is defined by a hollow cylindrical central riser 32 disposed coaxially in the illustrative cylindrical pressure vessel 12. Primary coolant heated by the reactor core 10 flows upward through fluid conduits passing through the internal CRDM 30 and upward through the hollow central riser 32. The heated primary coolant discharges at the top of the hollow central riser 32 and is diverted downward by a diverter 34 (which optionally may define the bottom of the integral pressurizer 14). The diverted primary coolant flows downward through an annulus defined between the cylindrical central riser 32 and the walls of the cylindrical pressure vessel 12, and is then diverted upward by the bottom of the pressure vessel 12 to return to the reactor core 10. Optional primary coolant pumps 36 may be provided to drive the primary coolant circulation, or to assist natural circulation. Alternatively, natural circulation may be relied upon for circulating the primary coolant. The illustrative system of FIG. 3 is merely an illustrative example, and other primary coolant circulation paths and/or circulation control components are also contemplated.

The pressure vessel 12 is suitably positioned substantially vertically. An optional skirt 40 may be provided to support the pressure vessel 12, or to bias against the pressure vessel 12 tipping over. The illustrative skirt 40 is positioned such that the lower portion of the pressure vessel 12 containing the reactor core 10 is located in a recess below ground. This optional arrangement is advantageous because it enables the lower region to be flooded for safety in the event of a LOCA or other accident.

The described components ensure circulation of the primary coolant from the reactor core 10 upward through the hollow central riser 32, and back down the annulus surrounding the central riser 32 to return to the reactor core 10. The reactor core 10 heats the circulating primary coolant, which in the PWR design is superheated. To provide steam generation, this circulating superheated primary coolant is brought into thermal communication with a secondary coolant (typically light water, $H_2O$ optionally containing various additives, solutes, or so forth) flowing in a secondary coolant path that is in fluid isolation from the primary coolant path through which the primary coolant flows. In some embodiments (not illustrated), this is achieved by flowing the primary coolant out a relatively large-diameter vessel penetration and into a separate steam generator unit. There, the primary coolant flows through flow paths or a flow volume in close proximity to and hence in thermal communication with a secondary coolant flow path or volume containing the secondary coolant. Heat is thereby transferred from the primary coolant to the secondary coolant in the separate steam generator unit, and this heat transfer converts secondary coolant into steam.

In the illustrative embodiment of FIG. 3, an integral steam generator is employed. An integral steam generator is a steam generator located in the same pressure vessel 12 containing the reactor core 10. In the illustrative example of FIG. 3, an integral steam generator 44 is located in the annulus surrounding the central riser 32, that is, in the annular space between the exterior of the central riser 32 and the inside walls of the pressure vessel 12. Secondary coolant in the form of feedwater is input via a feedwater inlet 50 into an annular feedwater inlet plenum 52 (or, alternatively, into a tubesheet) where it feeds into a lower end of the steam generator 44. The secondary coolant rises generally upward through the steam generator 44 in secondary coolant flow paths or volume that are in thermal communication with (but in fluid isolation from) proximate primary coolant flow paths or volume through which primary coolant flows generally downward. (Note that FIG. 3 does not show details of the steam generator). The steam generator configuration can take various forms. In some embodiments, the steam generator comprises tubes carrying primary coolant generally downward, while the secondary coolant flows generally upward in a volume outside of the tubes. Alternatively, the secondary coolant may flow generally upward through the steam generator tubes while the primary coolant flows generally downward outside of the tubes. The tubes may comprise straight vertical tubes, slanted vertical tubes, helical tubes wrapping around the central riser 32, or so forth. However arranged, heat transfer takes place from the superheated primary coolant to the secondary coolant, which converts the secondary coolant from the liquid phase to the steam phase. In some embodiments the steam generator may include an integral economizer in a lower portion of the steam generator. In some embodiments, the steam generator may comprise a plurality of constituent steam generators to provide redundancy. The resulting steam enters an annular steam plenum 54 (or, alternatively, into a tubesheet) and from there passes out one or more steam outlets 56.

The resulting steam (whether generated by an integral steam generator such as the illustrative integral steam generator 44, or by an external steam generator unit) can be used for substantially any purpose suitably accomplished using steam power. In the illustrative example of FIG. 3, the steam drives a turbine 60 which in turn drives an electrical power generator 62 to provide electrical power. In the illustrative example of FIG. 3, the secondary coolant circulates in a closed path. Toward this end, a steam condenser 64 downstream of the turbine 60 condenses the steam back into a liquid phase so as to recreate secondary coolant comprising feedwater. One or more pumps 66, 68 and one or more feedwater heaters 70, 72 or other feedwater conditioning components (e.g., filters, components for adding additives, or so forth) generate feedwater at a desired pressure and temperature for input to the feedwater inlet 50. A feedwater valve 74 controls the inlet feedwater flow rate.

With continuing reference to FIG. 3, the PWR further includes a digital processor(s) or electrical circuit(s) 80, 82, 90 configured to perform reactor power control including adjustment of the pressurizer water level setpoint. In the illustrative example, a reactor power control circuit or processor 80 operates the feedwater valve 74 to increase or decrease feedwater flow rate. In accordance with Table 1, increasing or decreasing feedwater flow rate produces a corresponding increase or decrease in reactor power. Additionally, in accordance with PWR control approaches disclosed herein, increasing or decreasing feedwater flow rate to produce a corresponding increase or decrease in reactor power also entails decreasing (in the case of feedwater flow rate increase) or increasing (in the case of feedwater flow rate decrease) the pressurizer water level setpoint. (This is seen in the rightmost column of Table 1). Toward that end, a feedwater flow rate monitoring signal 84 generated by a sensor integral with the feedwater valve 74 or by a separate feedwater flow meter (not shown) is input to a pressurizer water level control circuit or processor 82.

The pressurizer water level control circuit or processor 82 performs conventional pressure water level control. That is, if the monitored pressurizer water level 22 rises above an upper pressurizer water level limit then the pressurizer water level control circuit or processor 82 causes the RCS makeup/letdown valving 26 to perform primary coolant letdown to reduce the pressurizer water level. Similarly, if the monitored pressurizer water level 22 decreases below a lower pressurizer water level limit then the pressurizer water level control circuit or processor 82 causes the RCS makeup/letdown valving 26 to add makeup water to increase the pressurizer water level.

Additionally, however, the pressurizer water level control circuit or processor 82 includes a pressurizer water level setpoint adjustment circuit or processor 90 that adjusts the pressurizer level setpoint based on a predicted direction and magnitude of change of the pressurizer water level 18 predicted to result from the PWR power adjustment performed by the reactor power control circuit or processor 80. For example, if the reactor power control circuit or processor 80 performs a power adjustment by increasing the feedwater flow rate, then the corresponding predicted change in the pressurizer water level 18 is a decrease (see Table 1, first row). The magnitude of the decrease can be predicted based on simulations or empirical measurements, suitably embodied as a function of the magnitude of the feedwater flow rate increase. More generally, the magnitude of the change in pressurizer water level 18 can be predicted based on simulations or empirical measurements suitably embodied as a function of the magnitude of the corresponding change made by the reactor power control circuit or processor 80. The function may be embodied by a mathematical formula implemented by a digital processor or a suitable electrical circuit (e.g., an operational amplifier circuit configured to provide an analog implementation of the function).

Typically, the adjusting of the pressurizer water level setpoint also entails adjusting the upper and lower pressurizer water level limits to track with the adjusted pressurizer water level setpoint. In some embodiments this tracking is a simple linear operation—for example, if the lower pressurizer water level limit may be set to a fixed distance in centimeters below the pressurizer water level setpoint, and the upper pressurizer water level limit may be set to a fixed distance in centimeters above the pressurizer water level setpoint. Alternatively, the upper and lower pressurizer water level limits can have another relationship with the pressurizer water level setpoint, such as the upper limit being 5% above the pressurizer water level setpoint and the lower limit being 5% below the pressurizer water level setpoint.

The foregoing examples relate to power adjustment by adjusting the feedwater flow rate. As already discussed (see, e.g. Table 1), power adjustment by adjusting the temperature of the feedwater fed into the steam generator is also contemplated, as is power adjustment by a combination of feedwater flow and temperature adjustment. Toward this end, a temperature sensor 92 suitably measures the feedwater temperature at or near the feedwater inlet 50 (for example, in illustrative FIG. 3 the sensor is near or built into the feedwater valve 74). The temperature measured by the sensor 92 is also input to the pressurizer water level adjustment circuit or processor 90 to enable adjustments of the pressurizer water level setpoint based on the direction and magnitude of changes in temperature of feedwater input to the steam generator 44.

Figure 4:
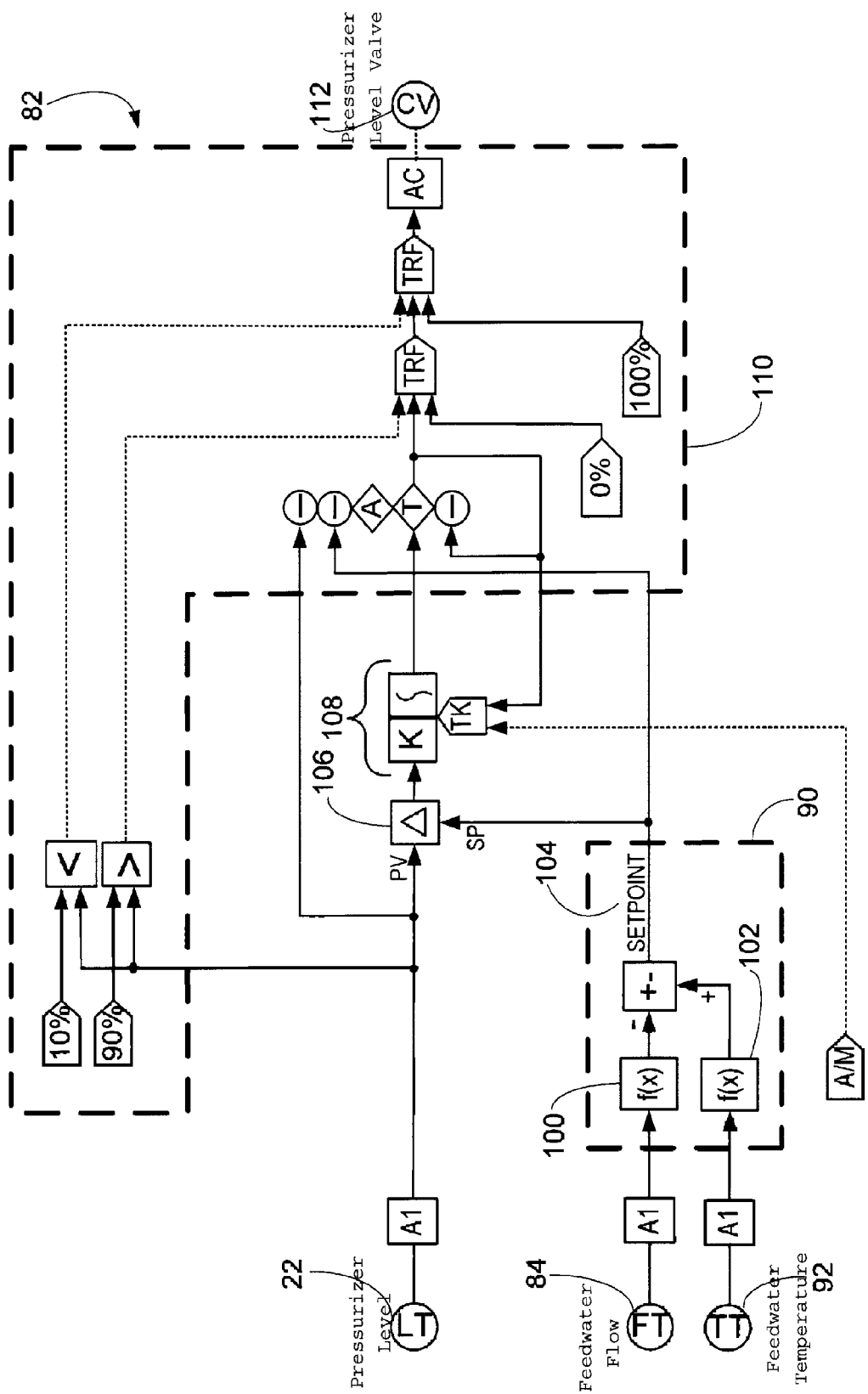
FIG. 4 schematically shows a suitable embodiment of the pressurizer water level control circuit of the PWR system of FIG. 3.

With reference to FIG. 4, a suitable embodiment of the pressurizer water level control circuit or processor 82 of FIG. 3 is shown, including a suitable embodiment of the pressurizer water level adjustment circuit or processor 90. In the illustrative example of FIG. 4, the predicted effect of the feedwater flow rate and temperature on the pressurizer water level is a linear superposition combination of the individual flow rate and temperature effects. Accordingly, a first function 100 predicts the effect of feedwater flow rate on the predicted pressurizer water level, while a second function 102 predicts the effect of inlet feedwater temperature on the predicted pressurizer water level. A pressurizer water level setpoint 104 is then a linear (i.e., subtractive, due to the different polarities of the flow rate and feedwater temperature effects as seen in Table 1) combination of the outputs of the functions 100, 102. A difference block 106 computes the difference feedback signal between the monitored pressurizer water level 22 and the pressurizer water level setpoint 104, and suitable feedback control (a proportional-integral or PI control block 108, in the illustrative example of FIG. 4) generates a suitable control signal. The remaining circuitry 110 shown in FIG. 4 is designed to generate a single control signal 112 suitable for input to a "smart" embodiment of the RCS makeup/letdown valving 26, such as a reactor coolant inventory and purification system (RCIPS) embodiment.

It is to be understood that the various control components 80, 82, 90 may be variously embodied. For example, in some embodiments a single digital processing device embodies all controller components 80, 82, 90. In other embodiments, these may be two or even three distinct processing devices or circuits. The various control components 80, 82, 90 may also be embodied by various combinations of digital processors and/or electrical circuits.

The preferred embodiments have been illustrated and described. Obviously, modifications and alterations will occur to others upon reading and understanding the preceding detailed description. It is intended that the invention be construed as including all such modifications and alterations insofar as they come within the scope of the appended claims or the equivalents thereof.

We claim:

1. An apparatus comprising:
a circuit or digital processor configured to adjust reactor power generated by a pressurized water reactor (PWR) by:
  (i) changing an average primary coolant temperature of primary coolant of the PWR by adjusting at least one of flow rate and temperature of feedwater into a steam generator that is in thermal communication with the PWR, and
  (ii) adjusting a pressurizer water level setpoint of the PWR upward if the change (i) is to a higher average primary coolant temperature and downward if the change (i) is to a lower average primary coolant temperature.

2. The apparatus as set forth in claim 1, wherein:
the changing (i) comprises increasing feedwater flow rate into the steam generator in thermal communication with the PWR, and
the adjusting (ii) comprises adjusting the pressurizer water level setpoint of the PWR downward.

3. The apparatus as set forth in claim 1, wherein:
the changing (i) comprises decreasing feedwater flow rate into the steam generator in thermal communication with the PWR, and
the adjusting (ii) comprises adjusting the pressurizer water level setpoint of the PWR upward.

4. The apparatus as set forth in claim 1, wherein:
the changing (i) comprises increasing temperature of feedwater being fed into the steam generator in thermal communication with the PWR, and
the adjusting (ii) comprises adjusting the pressurizer water level setpoint of the PWR upward.

5. The apparatus as set forth in claim 1, wherein:
the changing (i) comprises decreasing temperature of feedwater being fed into the steam generator in thermal communication with the PWR, and
the adjusting (ii) comprises adjusting the pressurizer water level setpoint of the PWR downward.

6. The apparatus as set forth in claim 1, wherein the steam generator in thermal communication with the PWR is an integral steam generator disposed inside a pressure vessel of the PWR.

7. The apparatus as set forth in claim 1, wherein a magnitude of the adjusting (ii) is a function of the changing (i).

8. The apparatus as set forth in claim 1, wherein the adjusting (ii) further includes adjusting upper and lower pressurizer water level limits to track with the adjusted pressurizer water level setpoint, and the circuit or digital processor is further configured to perform a method comprising:
adding makeup water to a reactor coolant system (RCS) of the PWR conditional upon a monitored pressurizer water level of the PWR decreasing below the adjusted pressurizer water level lower limit; and
performing letdown of water from the RCS of the PWR conditional upon the monitored pressurizer water level of the PWR increasing above the adjusted pressurizer water level lower limit.

9. A pressurized water reactor (PWR) comprising:
a pressure vessel;
a reactor core disposed in the pressure vessel;
an integral or external pressurizer;
primary coolant disposed in the pressure vessel and heated by operation of the reactor core, the primary coolant not including a soluble boron poison in the primary coolant; and
an apparatus as set forth in claim 1.

10. A method comprising:
operating a pressurized water reactor (PWR) comprising a nuclear reactor core contained in a pressure vessel to generate electric power wherein the operating includes operating a pressurizer to regulate pressure in the pressure vessel of the PWR; and
during the operating:
  performing a PWR power adjustment comprising adjusting at least one of flow rate and temperature of secondary coolant flowing into a steam generator of the PWR; and
  adjusting a pressurizer water level setpoint based on a predicted direction and magnitude of change of a pressurizer water level of the PWR predicted to result from the performing the PWR power adjustment.

11. The method as set forth in claim 10, wherein:
the performing a PWR power adjustment comprises one of increasing and decreasing the secondary coolant flow rate; and
the adjusting of the pressurizer water level setpoint comprises one of lowering and raising the pressurizer water level setpoint based on a predicted decrease or increase in primary coolant volume in a reactor coolant system (RCS) of the PWR predicted to result from the increasing or decreasing of the secondary coolant flow rate.

12. The method as set forth in claim 10, wherein:
the performing a PWR power adjustment comprises one of increasing and decreasing the secondary coolant flow rate into an integral steam generator of the PWR; and
the adjusting of the pressurizer water level setpoint comprises one of lowering and raising the pressurizer water level setpoint based on a predicted decrease or increase in primary coolant volume in a reactor coolant system (RCS) of the PWR predicted to result from the increasing or decreasing of the secondary coolant flow rate through the integral steam generator of the PWR.

13. The method as set forth in claim 10, wherein:
the performing a PWR power adjustment comprises one of increasing and decreasing the temperature of secondary coolant flowing into the steam generator of the PWR; and
the adjusting of the pressurizer water level setpoint comprises one of raising and lowering the pressurizer water level setpoint based on a predicted increase or decrease in primary coolant volume in a reactor coolant system (RCS) of the PWR predicted to result from the increasing or decreasing of the temperature of secondary coolant flowing into the steam generator of the PWR.

14. The method as set forth in claim 10, wherein:
the performing a PWR power adjustment comprises one of increasing and decreasing the temperature of secondary coolant flowing into an integral steam generator of the PWR; and
the adjusting of the pressurizer water level setpoint comprises one of raising and lowering the pressurizer water level setpoint based on a predicted increase or decrease in primary coolant volume in a reactor coolant system (RCS) of the PWR predicted to result from the increasing or decreasing of the temperature of secondary coolant flowing into the integral steam generator of the PWR.

15. The method as set forth in claim 10, wherein the method does not include operating the PWR with a concentration of a soluble poison in a primary coolant of the PWR.

16. A pressurized water reactor (PWR) comprising:
a pressure vessel;
a reactor core disposed in the pressure vessel;
an integral or external pressurizer;
primary coolant disposed in the pressure vessel and heated by operation of the reactor core;
an integral steam generator disposed in the pressure vessel and configured to convert secondary coolant in the form of feedwater into steam by heat transfer from the primary coolant heated by operation of the reactor core to secondary coolant in the steam generator;
a feedwater valve arranged to control feedwater flow rate into the integral steam generator; and
a controller configured to perform a PWR control method including the operations of (i) adjusting PWR power by operating the feedwater valve to increase or decrease feedwater flow rate and (ii) adjusting a pressurizer water level setpoint based on a predicted direction and magnitude of change of a pressurizer water level of the PWR predicted to result from the adjusting (i).

17. The PWR as set forth in claim 16, wherein the primary coolant does not include a soluble boron poison.

18. The PWR as set forth in claim 17, further comprising:
an integral pressurizer.

19. The PWR as set forth in claim 16, wherein the controller is configured to perform the operation (ii) by:
decreasing the pressurizer water level set point in correspondence with increasing the feedwater flow rate, and
increasing the pressurizer water level in correspondence with decreasing the feedwater flow rate.

20. A pressurized water reactor (PWR) comprising:
a pressure vessel;
a reactor core disposed in the pressure vessel;
an integral or external pressurizer;
primary coolant disposed in the pressure vessel and heated by operation of the reactor core, the primary coolant not including a soluble boron poison in the primary coolant;
a controller configured to perform a method including the operations of:
performing a PWR power adjustment; and
adjusting a pressurizer water level set point based on a predicted direction and magnitude of change of a pressurizer water level of the PWR predicted to result from the performing the PWR power adjustment;
a steam generator configured to bring the primary coolant into thermal communication with secondary coolant to transfer heat from the primary coolant to the secondary coolant to convert the secondary coolant to steam; and
a feedwater valve arranged to control flow rate of the secondary coolant into the steam generator;
wherein the controller is configured to perform a PWR power adjustment by operating the feedwater valve to increase or decrease the flow rate of secondary coolant into the steam generator.

* * * * *